United States Patent [19]
Tsukamoto et al.

[11] Patent Number: 5,857,494
[45] Date of Patent: Jan. 12, 1999

[54] PIPELINE STRUCTURE WITH A LINING MATERIAL, AN END STRUCTURE OF SAID PIPELINE AND A METHOD FOR APPLYING A LINING MATERIAL TO A PIPELINE

[75] Inventors: Katsuyoshi Tsukamoto, Tokyo; Shigeru Toyoda, Saitama-ken; Sofumi Sato, Kanagawa-ken; Masakatsu Hyodo, Takatsuki; Kiyoshi Uegaki, Takarazuka; Masatoshi Ishikawa, Osaka; Hitoshi Saito, Toyonaka, all of Japan

[73] Assignees: Tokyo Gas Kabushiki Kaisha, Tokyo; Ashimori Kogyo Kabushiki Kaisha, Osaka, both of Japan

[21] Appl. No.: 578,696
[22] PCT Filed: Apr. 27, 1994
[86] PCT No.: PCT/JP94/00705
  § 371 Date: Dec. 27, 1995
  § 102(e) Date: Dec. 27, 1995
[87] PCT Pub. No.: WO95/29052
  PCT Pub. Date: Nov. 2, 1995

[51] Int. Cl.⁶ .................................................. F16L 9/14
[52] U.S. Cl. ........................... 138/140; 138/98; 138/141; 138/124; 138/126
[58] Field of Search .................... 138/140, 137, 138/123–126, 141, 98

[56] References Cited

U.S. PATENT DOCUMENTS 5,164,237  11/1992  Kaneda et al. .................. 428/37.4

FOREIGN PATENT DOCUMENTS 60-41276  9/1985  Japan .
1-165430  6/1989  Japan .
1-232022  9/1989  Japan .
3-11518   3/1991  Japan .

*Primary Examiner*—Patrick F. Brinson

[57] ABSTRACT

A pipeline structure with a lining material wherein a hermetic outer tube is disposed at the inner surface of a pipeline, and an inner lining material is disposed at the inner surface of the outer tube, said inner lining being made of a rigid fiber-reinforced plastic wherein a thermosetting resin is reinforced by a fiber reinforcement material.

5 Claims, 5 Drawing Sheets

PIPELINE STRUCTURE WITH A LINING MATERIAL, AN END STRUCTURE OF SAID PIPELINE AND A METHOD FOR APPLYING A LINING MATERIAL TO A PIPELINE

BACKGROUND OF THE INVENTION

1. Technical Field

The present invention relates to a novel structure and method for applying a lining material to reinforce pipelines such as a gas conduit, a city water pipe, a sewage pipe, pipelines for laying telecommunication cables or electric cables, and particularly, pipelines embedded in the ground. More particularly, the present invention relates to a technical means suitable for applying a lining material to a gas conduit or intermediate line with a working pressure of approximately 3 to 10 $kg/cm^2$.

2. Background Art

A conventional method for applying a lining material to an underground pipeline comprises the steps of depositing a hermetic film on the outer surface of a tubular fiber reinforcement material composed of a tubular woven or unwoven fabric, or a combination of tubular woven and unwoven fabrics superimposed one over the other to provide a lining material, applying a thermosetting resin liquid to the inner surface of the lining material and impregnating the thermosetting resin liquid into the tubular fiber reinforcement material, inserting the lining material into the pipeline while the lining material is being reversed under a fluid pressure, pressing the lining material against the inner surface of the pipeline under the fluid pressure, curing the thermosetting resin liquid so as to adhesively attach the lining material to the inner surface of the pipeline, and causing the thermosetting resin liquid and the tubular fiber reinforcement material to cooperate together to provide a rigid FRP (FIBER-REINFORCED PLASTICS) tube within the pipeline.

This method attempts to reduce the adhesive force between the lining material and the inner surface of the pipeline so as to prevent the lining material from cracking as the pipeline is damaged, or the joints from detaching due to earthquake or the like. This method also utilizes high strength fiber such as a glass fiber or an aromatic polyamide fiber on the circumference of the lining material so as to withstand internal or external pressure and insure a fluid path if the lining material is exposed as a result of damage to the pipeline (see U.S. Pat. No. 5,164,237).

Such a lining method is effective in the case that the pipeline is composed of cast iron pipes or fume pipes, but is not sufficiently effective particularly when it is applied to a steel pipe such as a gas conduit with an intermediate working pressure of approximately 3 to 10 $kg/cm^2$ (hereinafter, referred to as an "intermediate pressure A line").

The intermediate pressure A line uses carbon steel pipes which have a high strength and tenacity. These pipes are welded together to form a long pipeline system. Bent pipes are welded to bent portions of the pipeline to provide an integral pipeline system. With such a pipeline system, if the ground is liquified or subjected to contraction due to earthquake, the resulting stress tends to be concentrated on the bent portions.

Figure 3A:
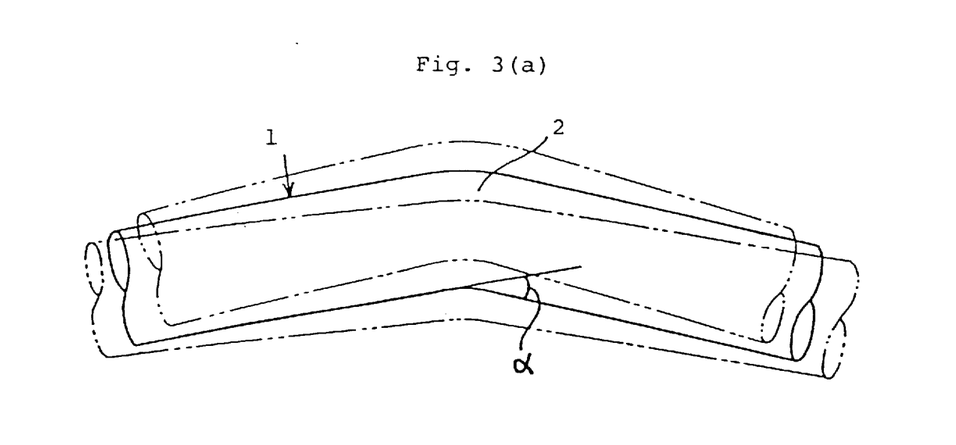
FIG. 3(a) is a side view showing a bent portion of a steel pipe with an lining material as known in the art.
Figure 3B:
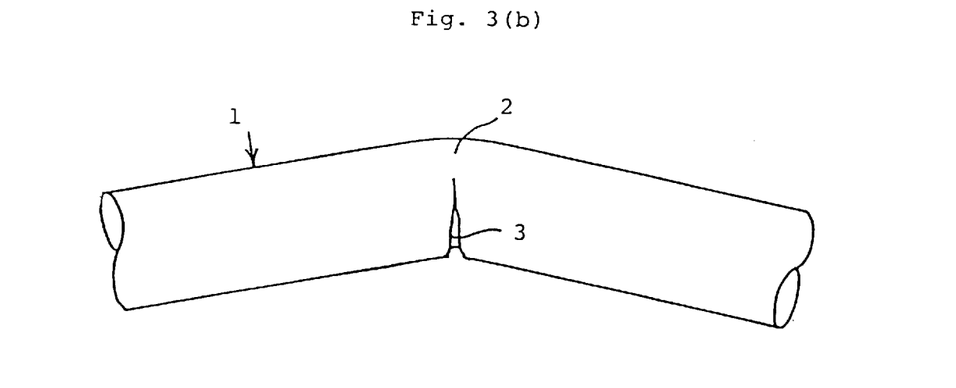
FIG. 3(b) is a side view showing the manner in which a crack occurs in the bent portion of a pipe as shown in FIG. 3(a)

FIG. 3 shows the manner in which the bent portion of the intermediate pressure A line fractures. FIG. 3(*a*) shows a bent portion 2 of a pipeline 1. When the ground contracts due to an earthquake or the like, the pipeline 1 is repeatedly extended and contracted in a longitudinal direction. This results in a change in the angle of the bent portion 2. This change causes the bent portion 2 to be significantly deformed in the direction in which it is bent and extended. If the bent angle α of the bent portion 2 increases, the bent portion 2 is urged into the pipe. If the bent angle a of the bent portion 2 decreases when the bent portion 2 is extended, a portion of the bent portion which has been urged into the pipe is subject to extension. When the bent portion 2 is locally deflected to a substantial extent, a large crack 3 occurs within the bent portion 2 due to fatigue, as shown in FIG. 3(*b*).

Figure 3C:
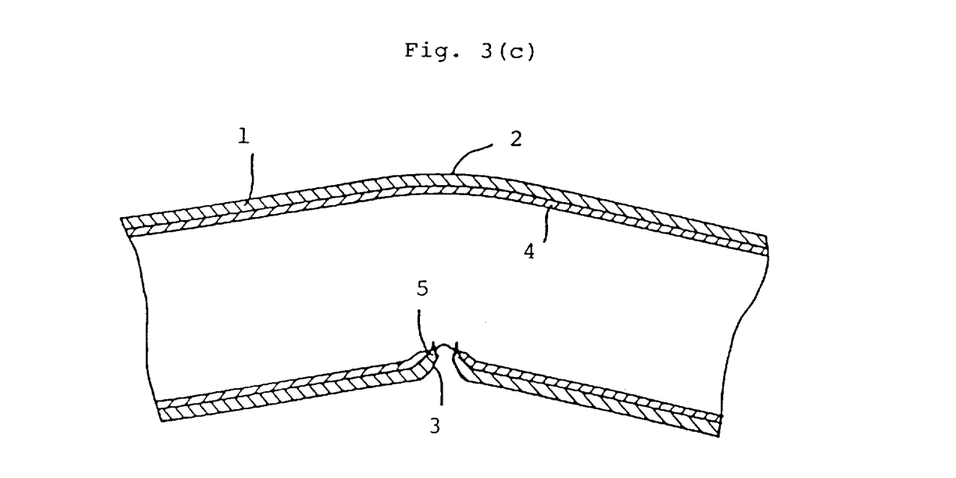
FIG. 3(c) is a vertical sectional view of the steel pipe and schematically shows the bent portion with the lining material damaged by burrs which occur when the bent portion of the pipe as shown in FIG. 3(a) is subject to a crack.

In the case that a lining material 4 is adhered to the inner surface of the pipeline 1, the edge of the crack 3 is bent inwardly to produce sharp burrs 5. These burrs 5 break the lining material 4 as shown in FIG. 3(*c*). Thus, damage to the pipeline 1 causes corresponding damage to the lining material 4.

A cast iron pipe has a low tenacity. Thus, if a cast iron pipe fractures, burrs 5 are rarely produced. Thus, a fluid path can be maintained since the lining material 4 is free from damage. On the other hand, a steel pipe has a high tenacity. Thus if a shock load is applied to a steel pipe, it will not fracture as opposed to the cast iron pipe. However, a crack 3 is likely to occur when local stress is concentrated on the bent portion 2. The resulting burrs 5 will cause damage to the lining material 4.

An adhesive or a seal is applied to the end of the lining material within the pipeline so as to prevent the entry of a fluid between the lining material and the pipeline. Normally, a metal ring is fit within the end of the lining material. The metal ring is extended to thereby press the end of the lining material against the inner surface of the pipeline (see JP, B, Sho. 60-41276).

With this treatment, however, the pipeline and the lining material is subjected to displacement if significant damage to the pipeline occurs. If the end of the lining material is displaced relative to the pipeline, the seal is damaged. A fluid then enters between the lining material and the pipeline and may flow out of a portion of the pipeline thus damaged.

SUMMARY OF THE INVENTION

It is a principal object of the present invention to overcome the problems encountered in the prior art and to provide a structure and method for applying a lining material, which prevents the lining material from being damaged by burrs which may occur when the bent portion of a pipeline composed of steel pipes is subjected to a crack and which insures the maintenance of a fluid path.

Another object of the present invention is to provide an improved end structure which maintains the sealing integrity in the end of a lining material if the lining material and a pipeline are displaced relative to each other, thereby preventing fluid leakage.

The present invention provides a pipeline structure with a lining material, characterized in that a hermetic outer tube 6 is disposed at the inner surface of a pipeline 1, and an inner lining material 4 is disposed at the inner surface of the outer tube 6 and made of a rigid FRP wherein a thermosetting resin 17 is reinforced by a fiber reinforcement material 12.

The present invention also provides a method for applying a lining material to a pipeline, characterized by inserting a hermetic outer tube 6 into a pipeline 1, then inserting into the outer tube 6 an inner lining material 4 wherein a fiber reinforcement material 12 is impregnated with a thermosetting resin liquid, applying a fluid pressure within the inner lining material 4 so as to expand the inner lining material 4, and curing the thermosetting resin liquid.

Preferably, the outer tube 6 is a tube made of polyethylene or nylon, or a tube to which a tubular unwoven fabric 9 is laminated.

It is preferred that the fiber reinforcement material 12 is reinforced in its circumferential direction so as to retard expansion under internal pressure, and that the radial expansion of the fiber reinforcement material 12 is small under the internal or working pressure of the pipeline.

The present invention further provides an end structure for a pipeline lining material, characterized in that a flexible sleeve 22 has one end which fits within the end of an inner lining material 4 disposed within the pipeline 1; a metal ring 23a is positioned within the flexible sleeve 22 and expanded to press the sleeve 22 and the inner lining material 4 against the inner surface of the pipeline 1; that the sleeve is slackened at its center; and that a metal ring 23b is fit to the other end of the sleeve 22 and expanded to press the sleeve 22 against the inner surface of the pipeline 1.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

The present invention will now be described with reference to the drawings.

Figure 1:
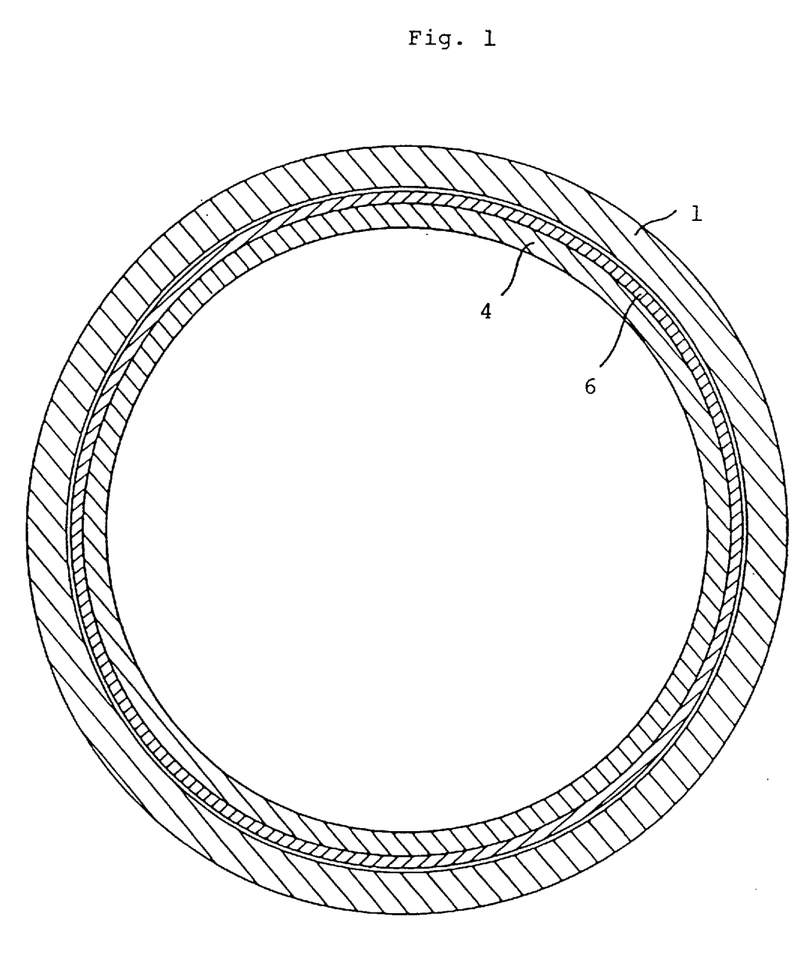
FIG. 1 is a schematic, transverse sectional view of a pipeline with an associated lining material according to the present invention.

FIG. 1 schematically shows, in transverse section, the wall structure of a pipeline with an associated lining material according to the present invention.

Element 1 designates a pipeline which is made of steel. A hermetic outer tube 6 is provided within the pipeline 1, but is not adhesively attached to the inner surface of the pipeline 1.

Figure 2A:
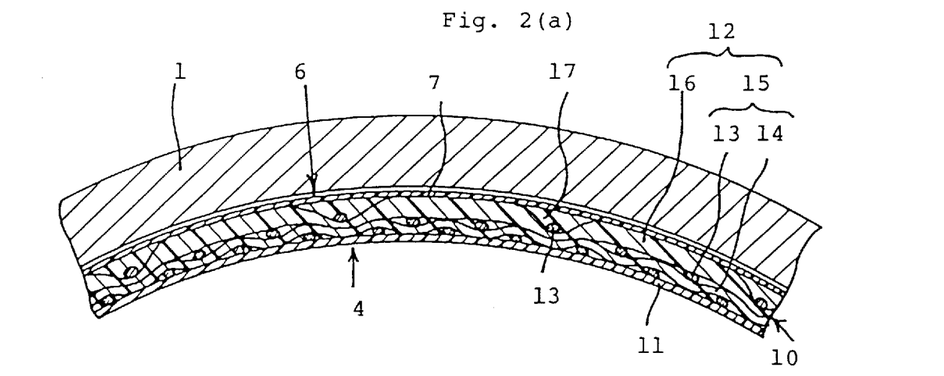
FIG. 2(a) is a transverse sectional view, in part, of the wall structure of a pipeline with a lining material according to one embodiment of the present invention.

FIG. 2(a) shows one form of the outer tube 6 wherein a tube 7 is made of a plastic, such as polyethylene or nylon, which has a low gas permeability. The outer tube 6 is composed only of the plastic tube 7.

Figure 2B:
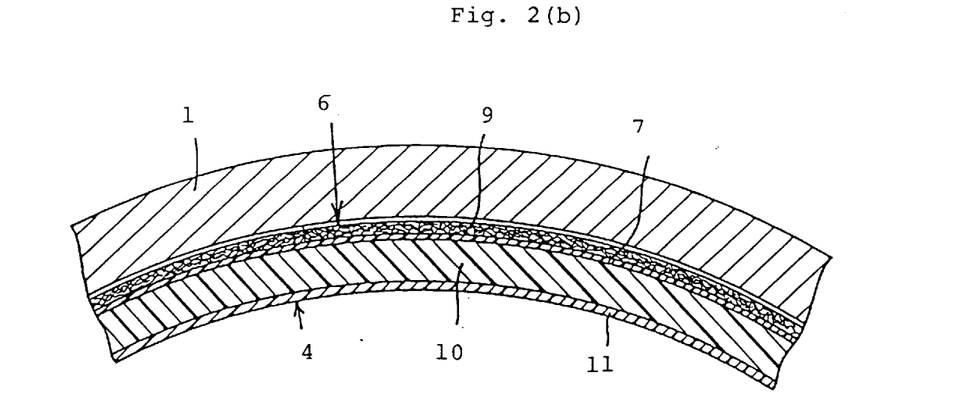
FIG. 2(b) is a transverse sectional view, in part, of the wall structure of a pipeline with a lining material according to another embodiment of the present invention.
Figure 2C:
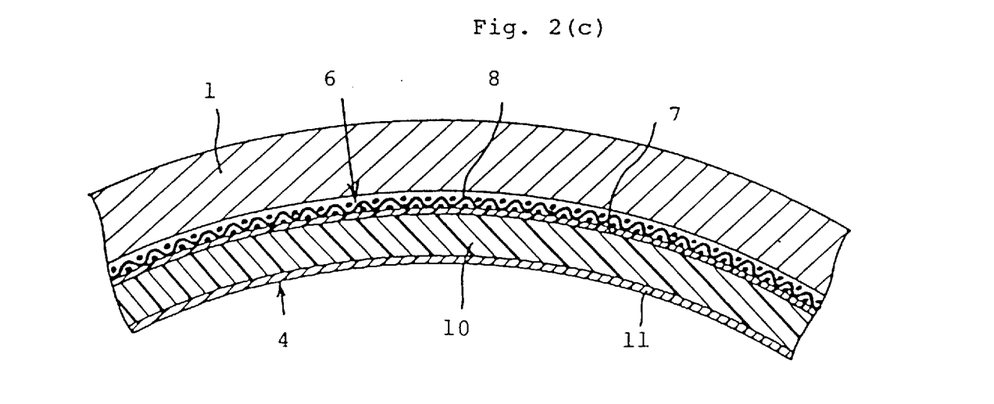
FIG. 2(c) is a transverse sectional view, in part, of the wall structure of a pipeline 1 with a lining material according to a further embodiment of the present invention.

FIG. 2(b) shows another form of the outer tube 6 wherein the plastic tube 7 is laminated to the inner surface of a tubular unwoven fabric 9. FIG. 2(c) shows another form of the outer tube 6 wherein the plastic tube 7 is laminated to the inner surface of a tubular woven fabric 8.

Referring next to FIGS. 1, 2(a), 2(b) and 2(c), 4 designates an inner lining material. In any of FIGS. 2(a), 2(b) and 2(c), the inner lining material 4 is composed of a FRP layer 10 wherein a thermosetting resin is reinforced by a fiber reinforcement material 12, and a hermetic film 11 attached to the inner surface of the FRP layer 10.

As shown in FIG. 2(a), the fiber reinforcement material 12 of the FRP layer 10 includes a tubular woven fabric 15 composed of warps 13 and wefts 14, and high-strength filament yarns 16 extending around the outer surface of the tubular woven fabric 15 with high density. The high-strength filament yarns 16 are interconnected by the warps 13 of the tubular woven fabric 15 so as to prevent undue expansion of the inner lining material due to internal pressure.

If the inner lining material 4 is subjected to undue expansion under the working internal pressure, it is highly likely that the inner lining material 4 would be damaged by burrs 5 which may occur when the pipeline 1 is damaged due to an earthquake or the like. This is because the inner lining material 4 is constantly pressed against the inner surface of the pipeline 1 during use.

An unsaturated polyester resin or an epoxy resin is used as the thermosetting resin 17 which forms the FRP layer 10.

The inner lining material 4 has a circular section within the outer tube 6. The inner lining material 4 is adhered to the inner surface of the outer tube 6 by the thermosetting resin 17. The outer tube 6 extends along the inner surface of the pipeline 1.

Next, in order to provide the pipeline with the inner lining material, the outer tube 6 is first inserted into the pipeline 1. The outer tube 6 may be pulled into the pipe 1. Preferably, the reversible outer tube 6 is inserted into the pipeline 1 while it is being turned inside out under fluid pressure.

After the outer tube 6 has been inserted into the pipeline 1, the inner lining material 4 wherein the fiber reinforcement material 12 is impregnated with the thermosetting resin liquid is inserted into the outer tube 6. It is also preferred that the reversible inner lining material 4 is inserted into the outer tube 6 while it is being turned inside out under fluid pressure.

The inner lining material 4 could be simply pulled into the outer tube 6. However, the fiber reinforcement material 12 which is impregnated with the thermosetting resin liquid is exposed to the outer tube 6. Thus, it is difficult to pull the inner lining material 4 into the outer tube 6 because the adhesive force of the thermosetting resin liquid retards the sliding movement of the inner lining material 4 relative to the outer tube 6.

Reversion of the inner lining material 4 under fluid pressure during insertion eliminates the drag between the inner lining material 4 and the outer tube 6. Advantageously, fluid or external pressure allows for an even distribution of the thermosetting resin liquid which has been applied to the inner lining material 4 before the inner lining material 4 is reversed. Thus, the thermosetting resin liquid can be evenly impregnated into the entire inner lining material 4 when the inner lining material 4 is applied. Also, the fluid pressure causes the inner lining material 4 thus reversed to be expanded into a cylindrical shape. The cylindrical inner lining material 4 is then pressed against and applied to the inner surface of the pipeline 1 through the outer tube 6.

First the outer tube 6 is inserted into the pipeline 1, and then, the inner lining material 4 is inserted into the outer tube 6. The thermosetting resin liquid is cured while the inner lining material 4 is expanded into a cylindrical shape under fluid pressure.

Figure 5:
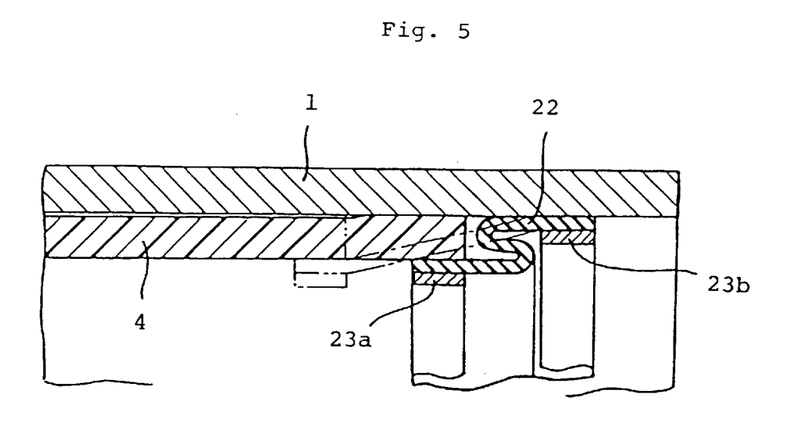
FIG. 5 is a vertical sectional view, in part, of one end of a pipeline and shows the end structure of a lining material made according to one embodiment of the present invention.

FIG. 5 shows the end structure of the inner lining material within the pipeline according to the present invention. Element 1 designates the pipeline. Element 4 designates the inner lining material applied within the pipeline 1. As shown in FIGS. 2(a), 2(b) and 2(c), the outer tube 6 is disposed between the pipeline 1 and the inner lining material 4.

In this case, the outer tube 6 may be absent at the end of the inner lining material 4.

Figure 6:
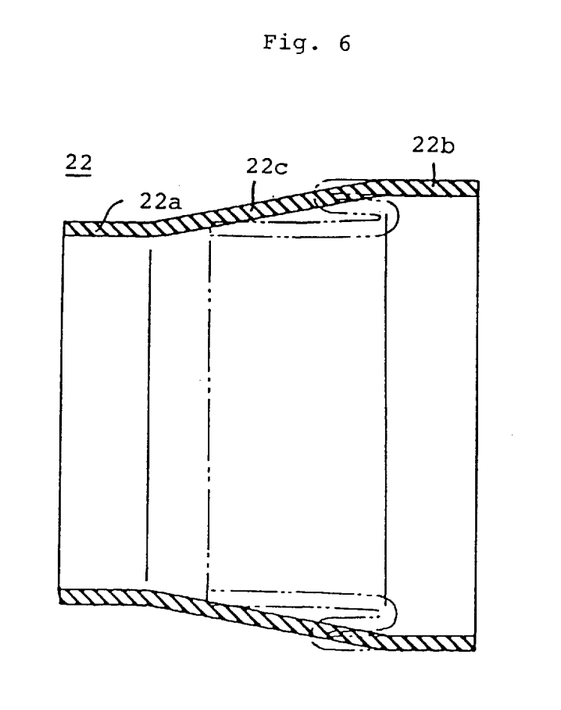
FIG. 6 is a vertical sectional view of a sleeve 22 associated with the end structure of the lining material of a pipeline according to the present invention.

Element 22 designates a flexible sleeve. The sleeve element 22 is made of rubber or a flexible plastic in which a thin woven fabric may be embedded. As shown in FIG. 6, the sleeve 22 has a small diameter portion 22a at its one end which has a diameter substantially equal to the inner diameter of the inner lining material 4, a large diameter portion 22b at the other end which has a diameter substantially equal to the inner diameter of the pipeline 1, and a taper portion 22c disposed therebetween.

The sleeve 22 is attached to the end of the inner lining material 4 with the taper portion 22c slackened as shown the broken line in FIG. 6. The small diameter portion 22a of the sleeve 22 is fit within the end of the inner lining material 1. A metal ring 23a is engaged with the small diameter portion 22a and then, expanded so as to press the small diameter portion 22a of the sleeve 22 and the end of the inner lining material 4 against the inner surface of the pipeline 1. The large diameter portion 22b of the sleeve 22 is engaged with the inner surface of the pipeline 1 outside of the inner lining material 4. A metal ring 23b is fit within the pipeline 1 and then, expanded so as to press the large diameter portion 22b of the sleeve 22 against the inner surface of the pipeline 1.

OPERATION

According to the present invention, the inner lining material 4 is composed of the rigid FRP layer wherein the fiber reinforcement material 12 is impregnated with the thermosetting resin 17. The inner lining material 4 is not adhesively attached to the pipeline 1 since the outer tube 6 exists between the inner lining material 4 and the inner surface of the pipeline 1.

If a crack 3 occurs in the bent portion 2 of the pipeline 1 as stated earlier, the inner lining material 4 may be inwardly deformed due to the resulting burrs 5. However, the inner lining material 4 would not be broken by the burrs 5 since the inner lining material 4 is separated from the pipeline 1. The inner lining material 4 will in no way be damaged if the pipeline 1 is damaged.

The inner lining material 4 can be swung within the pipeline 1 under a working pressure, particular when the inner lining material 4 has an outer diameter less than the inner diameter of the pipeline 1. If the crack 3 occurs, the inner lining material 4 is easily moved away from the burrs 5 and will in no way be damaged.

The outer tube 6 is composed of the tubular unwoven fabric 9 or the tuber woven fabric 8 laminated with the tube 7. The tubular unwoven fabric 9 or the tubular woven fabric 8 protects the tube 7 as well as the inner lining material 4 from being damaged by the burrs 5. This effectively prevents fluid leakage.

The tube 7 of the outer tube 6 is made of a material which has a low gas permeability, such as polyethylene or nylon. Thus, no gas will leak from the tube.

As shown by the solid line in FIG. 5, the end of the inner lining material 4 is hermetically sealed against the inner surface of the pipeline 1. The end of the inner lining material 4 is pressed between the metal ring 23a and the pipeline 1 so as to prevent the entry of a fluid between the inner lining material 4 and the pipeline 1.

If the pipeline 1 is broken or opened due to an earthquake or the like, the inner lining material 4 is separated from the pipeline 1 without suffering damage and remains in the form of a rigid tube. As a result, the end of the inner lining material 4 is displaced relative to the pipeline 1 or moved to the left as shown by broken line in FIG. 5.

The sealing integrity may be lost when displacement between the inner lining material 4 and the pipeline 1 takes place. The small diameter portion 22a of the sleeve 22 is moved with the inner lining material 4 whereas the large diameter portion 22b is fixed to the pipeline 1. The slackened portion is thus extended as shown by broken line in FIG. 5. Under the circumstance, the sleeve 22 prevents the entry of a fluid between the pipeline 1 and the inner lining material 4 and the leakage of the fluid from the broken portion of the pipeline 1.

Again, according to the present invention, the sleeve 22 is moved from its slackened condition to an extended condition to accommodate the relative displacement between the end of the inner lining material 4 and the pipeline 1 when the pipeline 1 is subject to fracture due to an earthquake or the like. Thus, the sleeve 22 maintains sealing integrity at the end of the inner lining material 4 and prevents fluid from entering between the pipeline 1 and the inner lining material 4 and from, flowing out of the pipeline 1 through its broken portion.

EXAMPLE

The pipeline 1 takes the form of an intermediate pressure A gas conduit (inner diameter of 204.7 mm and working pressure of 10 kg/cm$^2$).

Details of the outer tube 6 are as follows.

Example 1 (polyethylene tube)

A low density polyethylene tube having an outer diameter of 200.0 mm, a thickness of 0.45 mm, a tensile strength of 160 kg/cm$^2$, and an elongation of 700% when broken.

Example 2 (unwoven fabric)

A tubular unwoven fabric having an inner diameter of 188.6 mm, a thickness of 4.9 mm when a load of 500 g/cm$^2$ is applied, a density of 0.18, extension strength of 25 Kg/cm and an elongation of 120% when broken. The tubular unwoven fabric is made of polyester and laminated with the polyethylene tube of Example 1.

Comparative Example (without outer tube)

No outer tube 6 is employed.

To make the fiber reinforcement material 12 which forms the FRP layer 10 of the inner lining material 4, there is provided 640 lengths of warps 13, each including three polyester filament yarns having a thickness of 1,100 d and two polyester span-like filament yarns having a thickness of 1,000 d. 30 lengths of wefts 14 each includes two polyester filament yarns having a thickness of 1,000 d and are picked up over a span of 10 cm so as to provide a tubular woven fabric 15. 15 lengths of yarns, each including aramide filament yarns having a thickness of 1,500 d, are picked up over a span of 10 cm and are wound around the outer surface of the tubular woven fabric 15. A plurality of polyester span-like filament yarns or fastening yarns have a thickness of 1,000 d and are used to interconnect the yarns at thirty-two points.

The fiber reinforcement material 12 has a weight of 1,090 g/m, a width, in flattened state, of 290 mm, a thickness of 2.6 mm, a longitudinal strength of 330 kg/cm, and a breaking pressure of 23 kg/cm$^2$. The outer diameter of each of the pipeline 1 used in Example 1, Example 2 and Comparative Example under a working pressure (10 kg/cm$^2$) is as follows.

Example 1 205.1 mm

Example 2 197.1 mm

Comparative Example 206.9 mm

In the following tests, the thermosetting resin 17, which forms the FRP layer 10 of the inner lining material 4, is made of epoxy resin.

DEFORMATION TEST

The pipeline 1 used in Example, 1, Example 2, and Comparative Example has a length of approximately 2 m and is provided with a lining. The bent portion 2 has an angle of 22.5 degrees. The pipeline 1 is tested by a test machine shown in FIG. 4.

Figure 4:
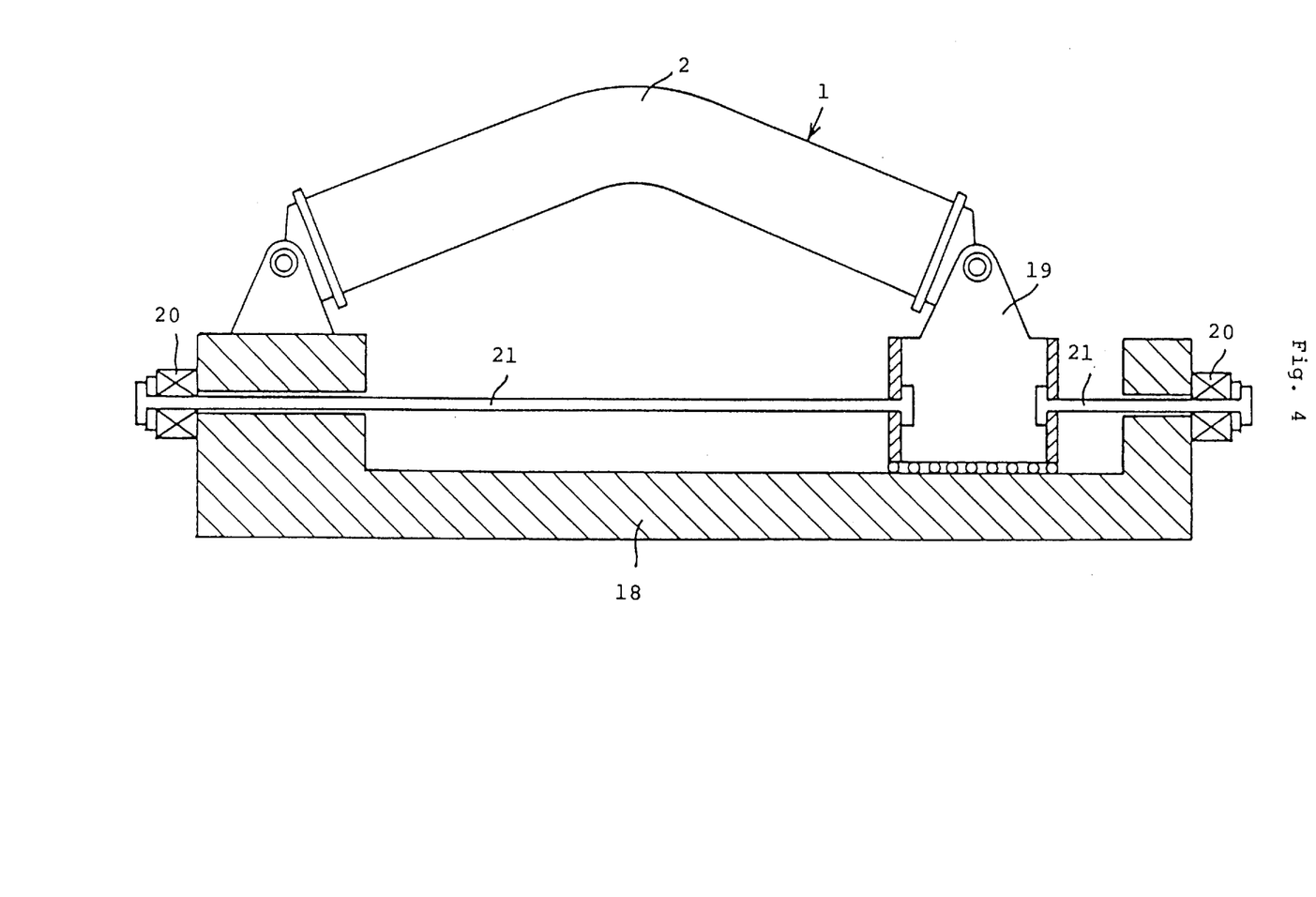
FIG. 4 is a side view of a machine for testing the deformation of a pipeline with a lining material.

In FIG. 4, 1 designates the pipeline with the bent portion 2. A lining material is applied to the inner surface of the pipeline used in Example 1, Example 2, and Comparative Example. 18 designates a stationary fixture on which a movable fixture 19 is slidably mounted. The pipeline 1 extends between the stationary fixture 18 and the movable fixture 19. 20 designates a center hole jack which includes an operating rod 21 adapted to move the movable fixture 19 along the stationary fixture.

After the pipeline 1 is mounted to the machine, an air under a pressure of 10 kg/cm$^2$ is injected into the inner lining material 4. The center hole jack 20 is then operated to reciprocatingly move the movable fixture 19 to the left and right by 50 mm and 100 mm from its initial position so as to bend the bent portion 2 of the pipeline 1. The movable fixture 19 is reciprocated until a crack occurs in the pipeline 1, and the air under pressure leaks from the pipeline 1. Measurement is taken at one-eighth of each reciprocating movement of the movable fixture 19.

The result of the test is shown in Table 1.

TABLE 1

| | OUTER TUBE | MOVEMENT | CRACK | AIR LEAKAGE |
|---|---|---|---|---|
| EXAMPLE 1 | POLY-ETHYLENE TUBE | ±50 mm ±100 mm | 2⅝ 1⅝ | 5⅝ 3⅝ |
| EXAMPLE 2 | UNWOVEN | ±50 mm ±100 mm | 2⅝ 6/8 | 7⅜ >10 |
| COMPARATIVE EXAMPLE | NONE | ±50 mm ±100 mm | 2⅝ 1⅝ | 5⅝ 1⅝ |

TENSILE TEST

Two straight pipes having a length of 900 mm are arranged in series and spaced 100 mm apart from each other. A lining material used respectively in Example 1, Example 2 and Comparative Example extends through the pipes. A pressure of 1 kg/cm$^2$ is applied to cure the thermosetting resin 17.

The ends of the inner lining material 4 within the pipes are treated according to the present invention. Thereafter, the ends of the pipes adjacent to opposite ends of the inner lining material 4 are closed. A water pressure of 10 kg/cm$^2$ is applied within the inner lining material 4. One of the pipes is fixed, whereas the other pipe is pulled. Load is measured when the distance between the pipes increases by 10 mm.

DAMAGE RESISTANCE TEST

The pipes with the lining material used in the tensile test are spaced 110 mm apart from each other with an internal pressure of 10 kg/cm$^2$. A chisel is brought into contact with the surface of the inner lining material 4 between the pipes. The chisel includes a tip having an angle of 45 degrees. The chisel is then urged into the inner lining material 4 by 3 mm. In this state, the chisel is moved along the length of the inner lining material by 100 mm and reciprocated ten times. The number of movement of the chisel is measured until the inner lining material 4 is broken to thereby cause the water under pressure to be ejected from the inner lining material 4.

In the event that the sealing integrity of the inner lining material 4 is still maintained after the chisel is reciprocated ten times, the same test continues, but the chisel is more deeply pressed into the inner lining material progressively by 2 mm. The test is repeated until the inner lining material 4 is broken to thereby cause ejection of the water under pressure.

TEST FOR DETERMINING THE FOLLOWABILITY OF THE INNER LINING MATERIAL AS THE PIPES ARE DISPLACED

Two pipes have a length of 900 mm and are serially arranged in an end-to-end fashion. A lining material used respectively in Example 1, Example 2 and Comparative Example is applied within the pipes. The two pipes are separated by 100 mm while a pressure of 10 kg/cm$^2$ is being applied within the inner lining material. At this time, measurement is taken to determine a maximum load. Also, the extent of extension of the inner lining material 4 is measured when the inner lining material 4 fractures.

The results of the tensile test, damage resistance test, and followability test are shown in Table 2.

TABLE 2

| ITEM | EXAMPLE 1 | EXAMPLE 2 | COMP. EXAMPLE |
|---|---|---|---|
| OUTER TUBE | PE TUBE | UNWOVEN FABRIC | NONE |
| TENSILE TEST | 5.10 t | 3.14 t | 8.54 t |
| RESISTANCE TO DAMAGE CHISEL DEPTH | | | |
| 3 mm | 10th TIME | 10th TIME | 3rd TIME |
| 5 mm | 10th TIME | 10th TIME | |
| 7 mm | 5th TIME | 10th TIME | |
| 9 mm | | 10th TIME | |
| 11 mm | | 10th TIME | |
| 13 mm | | 9th TIME | |
| FOLLOW ABILITY | | | |
| MAX ELONGATION | 100 mm | 100 mm | 41 mm |
| FRACTURE | NO | NO | YES |
| MAX LOAD | 10 t | 11 t | 18 t |

From the test for determining the followability of the inner lining material as the pipes are displaced, it is found that the inner lining material follows with displacement of the pipes. This is because according to the present invention, the inner lining material is not adhesively attached to the pipes. Thus, the inner lining material 4 will in no way fracture when the pipes fracture.

From the damage resistance test, it is found that the inner lining material of the present invention has an excellent resistance to damage. Thus, the inner lining material 4 will in no way be damaged by burrs which may occur when the pipeline 1 is subject to fracture. It also prevents fluid leakage.

It will readily be assumed that in Example 2, the unwoven fabric protects the inner lining material 4 to provide an improved resistance to damage. Also, in Example 1, the polyethylene tube or outer tube 6 per se is not related to the resistance to damage, but has significantly better resistance to damage than the comparative example.

As is clear from the result of the tensile test, the lining material of the comparative example is tensed upon application of substantial loads to the lining material. This is due to the fact that the lining material can not readily be separated from the pipeline since the lining material is adhesively attached to the pipeline. Accordingly, the lining material is likely to be broken by the burrs 5 when the bent portion 2 of the pipeline 1 is subject to fracture 3.

Conversely, the lining material of Example 1 is not under tension since it is separated from the pipeline. Accordingly, the lining material will be inwardly deformed if the burrs 5 urges the lining material. The lining material will in no way be broken by the burrs 5. It will be understood that better resistance to damage is obtained when the lining material is not adhered to the pipeline.

Deformation test is made to the pipeline 1 which has a bent portion 2 and a lining material. From this test, it is found that the number of movement until fluid leakage occurs after the pipeline 1 cracks is greater in Examples of the present invention. Thus, the lining material insures a fluid path if the steel pipe is damaged due to earthquake or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pipeline structure with a lining material which comprises:

a pipeline a hermetic outer tube non-adhesively disposed at the inner surface of the pipeline, and an inner lining made of a rigid fiber-reinforced plastic comprising a thermosetting resin reinforced by a fiber reinforcement material, said inner lining being disposed at the inner surface of said outer tube.

2. The pipeline structure with a lining material according to claim 1, wherein the hermetic outer tube is made of a material selected from the group consisting of polyethylene, nylon, and polyethylene or nylon to which a tubular fabric is laminated.

3. The pipeline structure with a lining material according to claim 1, wherein said fiber reinforcement material is made of a material which has a low coefficient of radial expansion upon application of a working pressure of the pipeline.

4. The pipeline structure with a lining material according to claim 1, wherein the pipeline is made of steel.

5. The pipeline structure with a lining material according to claim 1, wherein the inner lining is adhesively disposed at the inner surface of said outer tube.

* * * * *